(12) United States Patent
Matsunami

(10) Patent No.: US 9,010,389 B2
(45) Date of Patent: Apr. 21, 2015

(54) MOTORCYCLE TIRE

(75) Inventor: Toshiyuki Matsunami, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 408 days.

(21) Appl. No.: 13/404,066

(22) Filed: Feb. 24, 2012

(65) Prior Publication Data

US 2012/0216929 A1    Aug. 30, 2012

(30) Foreign Application Priority Data

Feb. 25, 2011    (JP) ................. 2011-040431

(51) Int. Cl.
*B60C 11/117*    (2006.01)
*B60C 11/03*    (2006.01)

(52) U.S. Cl.
CPC ......... *B60C 11/0302* (2013.04); *B60C 2200/10* (2013.04); *B60C 11/033* (2013.04); *B60C 2011/0381* (2013.04); *B60C 2011/0374* (2013.04)

(58) Field of Classification Search
CPC ............... B60C 2200/10; B60C 2011/0381; B60C 2011/0374; B60C 2011/0376; B60C 2011/0379; B60C 11/0302; B60C 11/033
USPC ................ 152/209.11, 209.28, 209.18, 209.1
IPC .................................................... B60C 11/117
See application file for complete search history.

(56) References Cited

U.S. PATENT DOCUMENTS

2006/0130949 A1* 6/2006 Nakamura ............... 152/209.11
2010/0126645 A1* 5/2010 Barboza et al. .......... 152/209.11

FOREIGN PATENT DOCUMENTS

| GB | 2114069 A | * | 8/1983 | .............. B60C 11/04 |
| JP | 05201207 A | * | 8/1993 | .............. B60C 11/08 |
| JP | 11-291715 A | | 10/1999 | |
| JP | 2001030719 A | * | 2/2001 | ............ B60C 11/113 |

OTHER PUBLICATIONS

English language machine translation of JP05-201207, 1993.*
English language machine translation of JP2001-030719, 2001.*

* cited by examiner

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A motorcycle tire comprises a tread portion grooved so that twenty narrow annular zones thereof each have a land ratio of 70 to 90%, wherein the twenty narrow annular zones are defined by equally dividing the developed tread width along the tread face by twenty. On each side of the tire equator, main oblique grooves and auxiliary oblique grooves are arranged alternately in the tire circumferential direction and inclined to one tire circumferential direction. The main oblique grooves on each side of the tire equator extend beyond the tire equator to have axially inner ends located on the other side of the tire equator. The auxiliary oblique grooves on each side of the tire equator do not extend beyond the tire equator to have axially inner ends located on the same side of the tire equator.

9 Claims, 6 Drawing Sheets

MOTORCYCLE TIRE

BACKGROUND OF THE INVENTION

The present invention relates to a pneumatic tire for motorcycles, more particularly to a tread structure capable of improving the drainage performance of the tire and the handling and stability of the motorcycle.

In recent years, according to the developments of high-powered motorcycles and expressway network, street motorcycle tires are required to provide improved handling and stability of the motorcycle.

In order to improve the street motorcycle tires used on well paved roads in terms of the handling and stability of the motorcycle, it is important to improve the critical grip performance by increasing the land ratio of the tread portion. However, if the land ratio of the tread portion is excessively increased, as the grooved area is decreased accordingly, the wet performance is deteriorated.

In Japanese Patent Application Publication No. 11-291715, a motorcycle tire is disclosed, wherein the tread portion is provided with oblique grooves, and the angles of the oblique grooves are specifically limited in relation to three zones defined by equally dividing a half tread width by three in order to improve uneven tread wear called heel and toe wear. In this motorcycle tire, it is difficult to fully improve the handling and stability and the drainage.

SUMMARY OF THE INVENTION

It is an object of the present invention to provide a motorcycle tire in which the handling and stability and the drainage can be achieved at a high level.

According to the present invention, a motorcycle tire comprises a tread portion having a tread face and tread edges, a pair of sidewall portions, a pair of bead portions each with a bead core therein, a carcass extending between the bead portions, and a belt made of a helically wound belt cord disposed radially outside the carcass in the tread portion, wherein the tread portion is provided with oblique grooves so that twenty narrow annular zones of the tread portion each have a land ratio in a range of from 70 to 90%, wherein the twenty narrow annular zones are defined by equally dividing a half developed tread width from the tire equator to each of the tread edges along the tread face by ten.

Preferably, the above-mentioned oblique grooves are arranged such that, on each side of the tire equator, main oblique grooves and auxiliary oblique grooves are arranged alternately in the tire circumferential direction and inclined to one circumferential direction, wherein the main oblique grooves on each side of the tire equator extend beyond the tire equator so as to have axially inner ends located on the other side of the tire equator, and the auxiliary oblique grooves on each side of the tire equator do not extend beyond the tire equator so as to have axially inner ends located on the same side of the tire equator.

Preferably, the difference between a maximum value and a minimum value of the land ratios in % of the axially innermost first narrow annular zone to the axially outer eighth narrow annular zone on each side of the tire equator is at most 7.

Further, the motorcycle tire according to the present invention may be provided with the following optional features:

the angle of the main oblique groove with respect to the tire circumferential direction is gradually decreased from a middle point toward its axially inner end and axially outer end;

on each side of the tire equator from the axially innermost first narrow annular zone to the axially outer eighth narrow annular zone, the main oblique grooves are inclined at an angle of from 10 to 35 degrees with respect to the tire circumferential direction;

on each side of the tire equator, the axially inner ends of the auxiliary oblique grooves are located on the second narrow annular zone next to the axially innermost first narrow annular zone;

the auxiliary oblique grooves have axially outer ends located on the axially outermost tenth narrow annular zone; and on each side of the tire equator from the second narrow annular zone to the eighth narrow annular zone, the angle of the auxiliary oblique groove with respect to the tire circumferential direction is in a range of from 10 to 35 degrees.

By such arrangement of the twenty narrow annular zones, it becomes possible to smoothen the change in the tread pattern rigidity from the tire equator to the tread edges and thereby the handling and stability can be improved.

Further, since all of the twenty narrow annular zones are grooved, the drainage in the tread portion can be improved during straight running as well as during cornering. And the critical cornering performance (cornering grip) can be improved to further improve the handling and stability.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure is the maximum air pressure load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like.

DESCRIPTION OF THE PREFERRED EMBODIMENTS

Embodiments of the present invention will now be described in detail in conjunction with the accompanying drawings.

Figure 1:
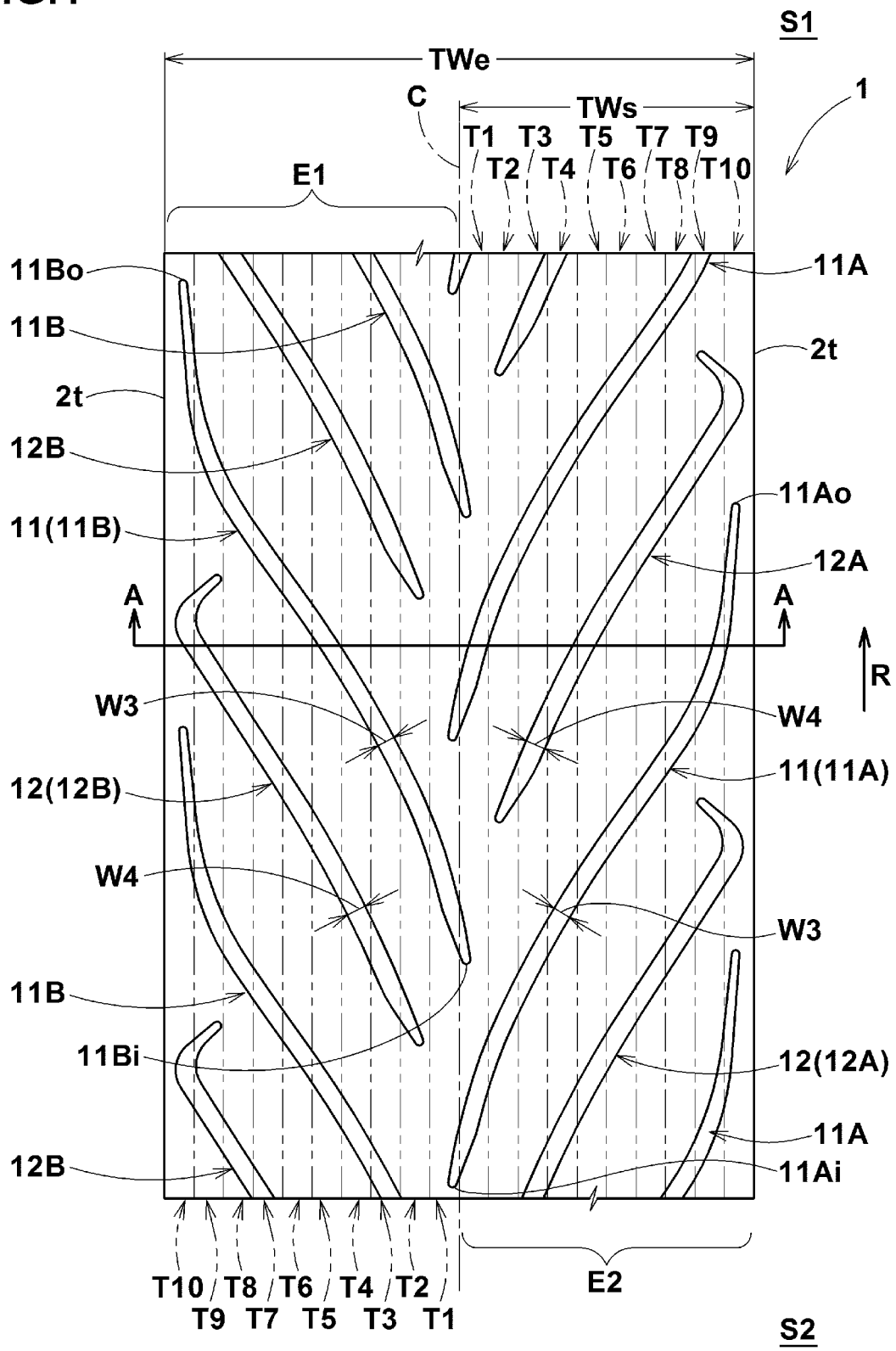
FIG. 1 is a developed partial view of the tread portion of a motorcycle tire according to an embodiment of the present invention.
Figure 2:
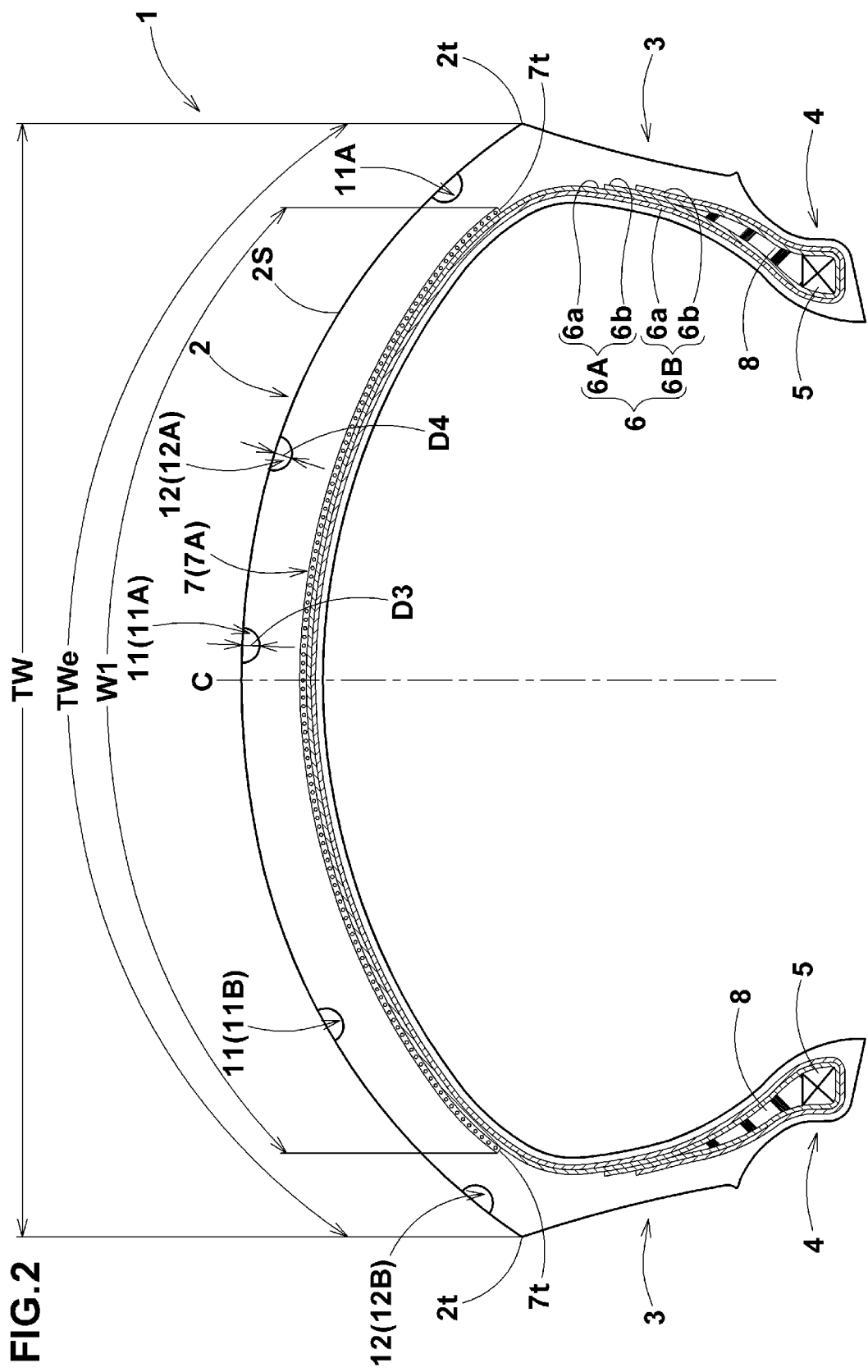
FIG. 2 is a cross sectional view of the motorcycle tire taken along line A-A in FIG. 1, showing an example of the internal tire structure.

According to the present invention, as shown in FIG. 1 and FIG. 2, a motorcycle tire comprises a tread portion 2, a pair of axially spaced bead portions 4 each with a bead core 5 therein, a pair of sidewall portions 3 extending between the tread edges 2t and the bead portions 4, a carcass 6 extending between the bead portions 4 through the tread portion 2 and sidewall portions 3, and a belt 7 disposed radially outside the carcass 6 in the tread portion 2.

The tread portion 2 is provided with a unidirectional tread pattern having an intended or designed rotational direction R.

The tread portion 2 is convexly curved so that the tread face 2s between the tread edges 2t is curved like an arc swelling radially outwardly as a characteristic of a motorcycle tire, and the maximum cross sectional width of the tire occurs between the tread edges 2t, namely, equals to the axial tread width TW.

The carcass 6 is composed of at least one carcass ply 6A, in this embodiment two carcass plies 6A and 6B, each ply made of carcass cords arranged at an angle of 65 to 90 degrees with respect to the tire equator C, and extending between the bead portions 4 through the tread portion 2 and sidewall portions 3, and further turned up around the bead core 5 in each of the bead portions 4 so as to form a pair of turned up portions 6b and a main portion 6a therebetween.

The carcass plies 6A and 6B in this embodiment are arranged so that, with respect to the tire equator, the carcass cords in the carcass ply 6A are inclined oppositely to the carcass cords in the carcass ply 6B although the absolute value of the inclination angle is the same.

For the carcass cords, organic fiber cords such as nylon, polyester and rayon can be used suitably.

The bead portions 4 are each provided between the carcass ply main portion 6a and turned up portion 6b with a bead apex 8 made of hard rubber extending radially outwardly in a tapered manner from the bead core. When two or more carcass plies are used, the radially outer ends of the turned up portions 6b thereof are positioned at different radially heights so as to smoothen the rigidity change of the sidewall portion.

The belt 7 in this embodiment is composed of at least one ply 7A (in this particular case only one ply) of helical windings of at least one belt cord, wherein the angle of the belt cord in each winding is not more than 5 degrees with respect to the tire circumferential direction. Thus, the belt 7 is the so-called jointless band.

For the belt cord, organic fiber cords, e.g. nylon, rayon, polyester, aramid and the like and steel cords can be used suitably.

The developed width W1 of the belt 7 is preferably set in a range of from 75 to 90% of the developed tread width TWe as shown in FIG. 2. Thus, the tire uniformity and high speed stability can be improved.

According to the present invention, the tread portion 2 is constructed such that its narrow zones T each have a land ratio L in a range of not less than 70% but not more than 90%.

The "land ratio" as used herein, denotes the ratio in percentage of the ground contacting area (namely, the land area excluding the grooved area) of the narrow zone T concerned to the gross area thereof.

The "narrow zones" as used herein, denotes ten zones T1-T10 defined on each side of the tire equator C (thus twenty zones in total) by equally dividing a half developed tread width TWs between the tire equator C and the tread edge 2t along the tread face 2s by ten.

As shown in FIG. 1, "T1" to "T10" denote the axially innermost first zone T1 to the axially outermost tenth zone T10, respectively.

"L1" to "L10" denote the land ratios of the narrow zones "T1" to "T10", respectively.

Preferably, the land ratios L1 to L10 are set to be not less than 72%, more preferably not less than 73%, but not more than 88%, more preferably not more than 87%.

Further, it is desirable that, in an extent from the first narrow zone T1 to the eighth narrow zone T8 on each side of the tire equator C, the difference (Lm−Ls) between the maximum value Lm and minimum value Ls of the land ratios L1 to L8 in % is limited to at most 7, preferably at most 6, more preferably at most 5 in view of to smoothen the tread pattern rigidity change and thereby to improve transient characteristics when leaning.

To achieve the above land ratios, the tread portion 2 is provided with a plurality of oblique grooves.

In this embodiment, the oblique grooves are a plurality of main oblique grooves 11 and a plurality of auxiliary oblique grooves 12.

As shown in FIG. 1, in each tread half (hereinafter, the "first tread half E1" on one side of the tire equator C and the "second tread half E2" on the other side of the tire equator C), the main oblique grooves 11 and auxiliary oblique grooves 12 are alternately arranged in the tire circumferential direction, and inclined to the above-mentioned tire rotational direction R from the tire equator side towards the tread edge side.

The main oblique grooves 11 have a groove width W3 of not less than 3.5 mm and not more than 5.5 mm, and a maximum groove depth D3 of not less than 4.0 mm and not more than 5.0 mm. The auxiliary oblique grooves 12 have a groove width W4 of not less than 3.5 mm and not more than 6.5 mm, and a maximum groove depth D4 of not less than 4.0 mm and not more than 5.0 mm.

In the entire tread portion, the main oblique grooves 11 include: first main oblique grooves 11A mainly located in the second tread half E2 and having an axially inner end 11Ai located in the first tread half E1 and an axially outer end 11Ao located in the second tread half E2; and second main oblique grooves 11B mainly located in the first tread half E1 and having an axially inner end 11Bi located in the second tread half E2 and an axially outer end 11Bo located in the first tread half E1.

Figure 3:
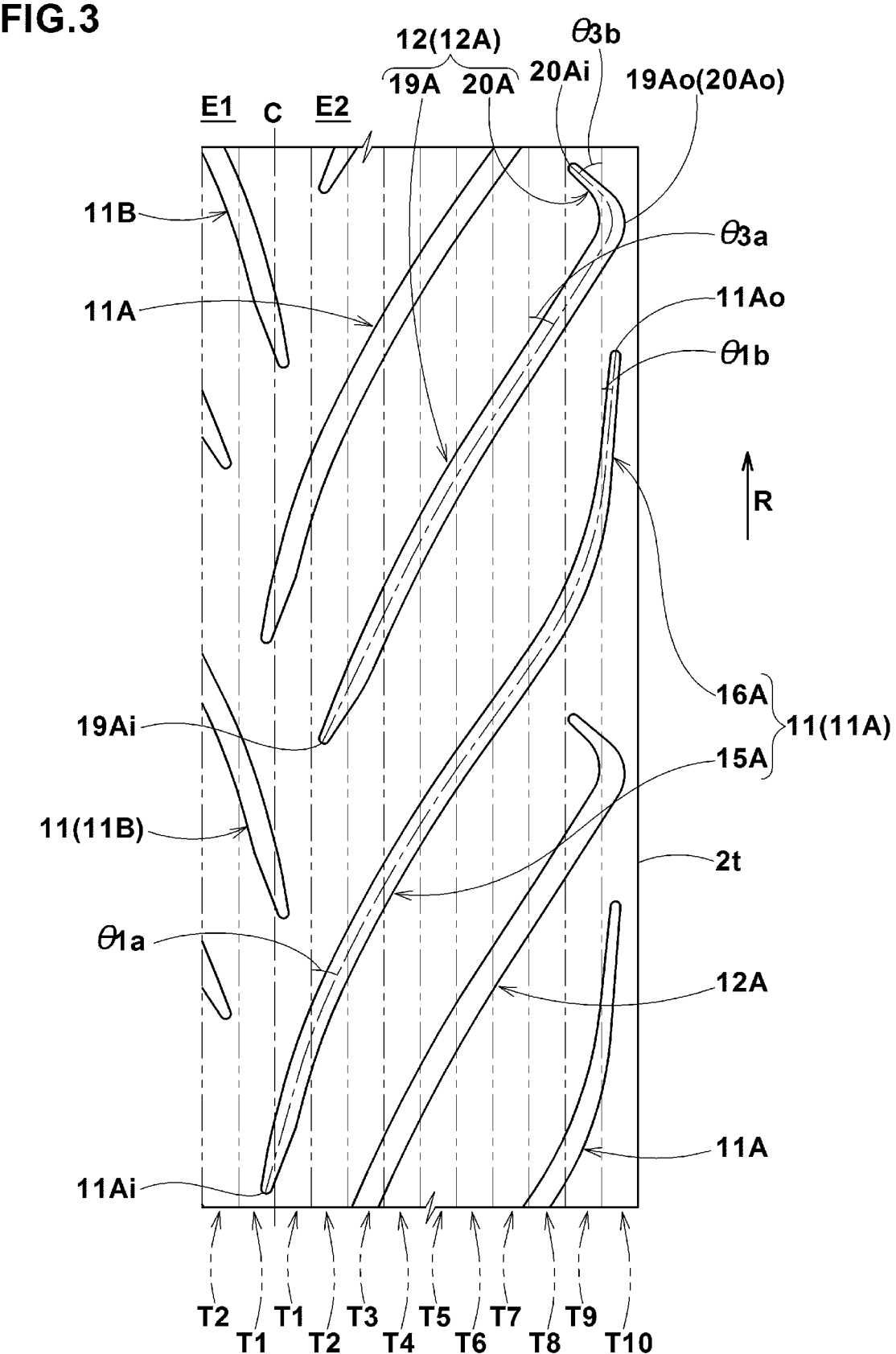
FIG. 3 is an enlarged view showing a right side half of FIG. 1.

More specifically, the axially inner end 11Ai of the first main oblique groove 11A is located in the first zone T1 of the first tread half E1, and the axially outer end 11Ao of the first main oblique groove 11A is located in the tenth zone T10 of the second tread half E2 as shown in FIG. 3.

Figure 4:
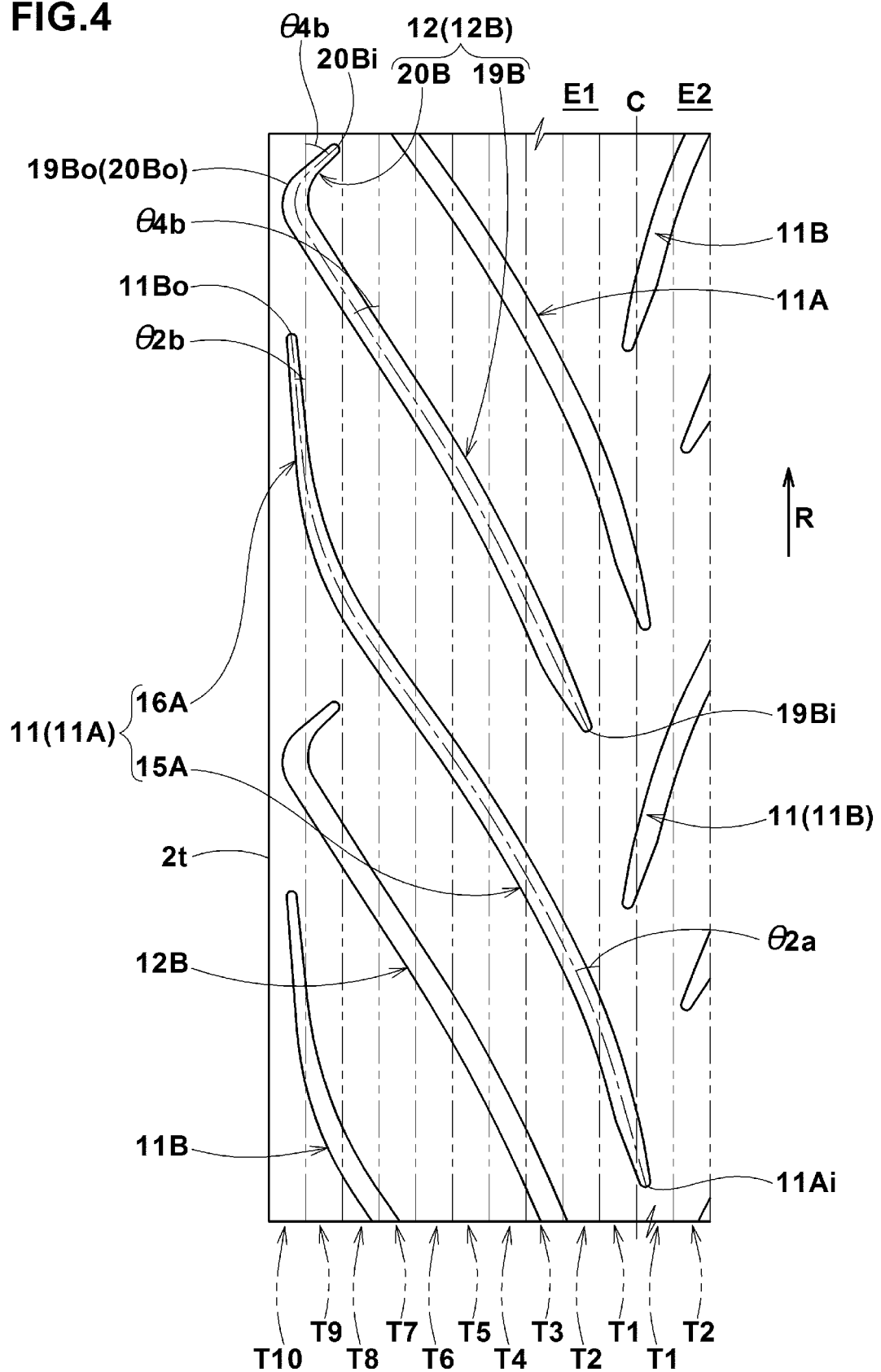
FIG. 4 is an enlarged view showing a left side half of FIG. 1.

Similarly, the axially inner end 11Bi of the second main oblique groove 11B is located in the first zone T1 of the second tread half E2, and the axially outer end 11Bo of the second main oblique groove 11B is located in the tenth zone T10 of the first tread half E1 as shown in FIG. 4.

The first main oblique groove 11A is made up of:
an axially inner groove part 15A which extends from the first zone T1 to the eighth zone T8 of the second tread half E2, while gradually increasing its angle θ1a with respect to the tire circumferential direction, so as to curve gently; and
an axially outer groove part 16A which extends from the inner groove part 15A to the axially outer end 11Ao, while gradually decreasing its angle θ1b with respect to the tire circumferential direction, so as to curve gently. Thus, the first main oblique groove 11A has an S-shaped configuration. Similarly, the second main oblique groove 11B is made up of: an axially inner groove part 15B which extends from the first zone T1 to the eighth zone T8 of the first tread half E1, while gradually increasing its angle θ2a with respect to the tire circumferential direction, so as to curve gently; and an axially outer groove part 16B which extends from the inner groove part 15B to the axially outer end 11Bo, while gradually decreasing its angle θ2b with respect to the tire circumferential direction, so as to curve gently. Thus, the second main oblique groove 11B has an S-shaped configuration.

As shown in FIG. 3 and FIG. 4, the first main oblique grooves 11A and second main oblique grooves 11B intersect the tire equator C and their axially outer ends 11Ao and 11Bo are located very close to the tread edges 2t. Therefore, it is possible to improve the drainage during straight running when the zones near the tire equator C mainly contact with the ground as well as during cornering when the camber angle is large and the zones distant form the tire equator contact with the ground.

Since the first and second main oblique grooves 11A and 11B are provided with the above-mentioned slightly-curved S-shaped configuration, the change in the tread pattern rigidity when the machine is leaned is smoothened from the axially inner ends 11Ai, 11Bi to the axially outer ends 11Ao, 11Bo, and the transient characteristic can be improved. Further, the handling and stability can be improved.

The above-mentioned angles θ1a and θ2a of the inner groove parts 15A and 15B of the main oblique grooves 11A and 11B (ranging from the first zone T1 to the eighth zone T8) are set in a range of not less than 10 degrees, preferably not less than 12 degrees, more preferably not less than 14 degrees, but not more than 35 degrees, preferably not more than 20 degrees, more preferably not more than 18 degrees in order to smoothen the pattern rigidity as explained.

If the angles θ1a and θ2a are less than 10 degrees, then there is a tendency that the handling force becomes very light and the stability of the motorcycle is deteriorated. If the angles θ1a and θ2a are more than 35 degrees, then as the handling requires more force, the handling tends to become heavy.

In this embodiment, further, as the angles θ1a and θ2a of the first and second main oblique grooves 11A and 11B with respect to the tire circumferential direction are gradually decreased toward the respective axially inner ends 11Ai and 11Bi, while tapering toward the opposite direction to the tire rotational direction R, the occurrence of a stepwise change in the tread pattern rigidity can be avoided, and the handling and stability can be further improved.

The auxiliary oblique grooves 12 include:
first auxiliary oblique grooves 12A located in the second tread half E2 and between the first main oblique grooves 11A; and
second auxiliary oblique grooves 12B located in the first tread half E1 and between the second main oblique grooves 11B.

In this embodiment, as shown in FIG. 3, the first auxiliary oblique groove 12A is made up of:
a main part 19A inclined in the same direction as the first main oblique grooves 11A; and
a secondary part 20A turned at the axially outer end 19Ao of the main part 19A to extend obliquely toward the tire equator,
wherein the axially outer end 19Ao is located in the tenth zone T10 of the second tread half E2.
The axially inner end 19Ai of the main part 19A is located in the second zone T2 of the second tread half E2.

Further, from the second zone T2 to the tenth zone T10, the angle θ3a of the main part 19A with respect to the tire circumferential direction is gradually increases so as to curve slightly.

The axially outer end 20Ao of the secondary part 20A is connected with the axially outer end 19Ao of the main part 19A, and the axially inner end 20Ai of the secondary part 20A is located in the ninth zone T9 of the second tread half E2. Further, the angle θ3b of the secondary part 20A with respect to the tire circumferential direction is substantially constant from the axially outer end 20Ao to the axially inner end 20Ai, and the angle θ3b is set in a range of from 35 to 55 degrees.

As shown in FIG. 4, the second auxiliary oblique groove 12B is made up of:
a main part 19B inclined in the same direction as the second main oblique grooves 11B, and
a secondary part 20B turned at the axially outer end 19Bo of the main part 19B to extend obliquely toward the tire equator,
wherein the axially outer end 19Bo is located in the tenth zone T10 of the first tread half E1. The axially inner end 19Bi of the main part 19B is located in the second zone T2 of the first tread half E1.

Further, from the second zone T2 to the tenth zone T10, the angle θ4a of the main part 19B with respect to the tire circumferential direction is gradually increases so as to curve slightly.

The axially outer end 20Bo of the secondary part 20B is connected with the axially outer end 19Bo of the main part 19B, and the axially inner end 20Bi of the secondary part 20B is located in the ninth zone T9 of the first tread half E1. Further, the angle θ4b of the secondary part 20b with respect to the tire circumferential direction is substantially constant from the axially outer end 20Bo to the axially inner end 20Bi, and the angle θ4b is set in a range of from 35 to 55 degrees.

As the second auxiliary oblique grooves 12A and 12B can smoothen the tread pattern rigidity change in cooperation with the main oblique grooves 11A and 11B, the handling and stability can be improved. Further, as the turned secondary parts 20A and 20B are formed near the tread edges 2t, the drainage during cornering at large camber angles can be further improved.

In order to effectively smoothen the tread pattern rigidity change, it is preferable that the angles θ3a and θ4a of the main parts 19A and 19B of the auxiliary oblique grooves 12A and 12B, respectively (at least in a range from the second zone T2 to the eighth zone T8) are set in the same range as that for the angles θ1a and θ2a of the inner groove part 15A and 15B of the main oblique grooves 11A and 11B, respectively.

Further, the axially inner end portions (near the ends 19Ai and 19Bi) of the main parts 19A and 19B of the auxiliary oblique grooves 12A and 12B, and the axially inner end portions (near the ends 20Ai and 20Bi) of the secondary parts 20A and 20B of the auxiliary oblique grooves 12A and 12B are tapered toward the respective ends. Thereby, the occurrence of a stepwise change in the tread pattern rigidity can be inhibited, and the handling and stability may be further improved.

As explained, since the land ratios L1 to L10 of the tread narrow zones T1 to T10 of the tread portion 2 in this embodiment are limited within a specific range, the tread pattern rigidity change can be effectively smoothened from the tire equator C to the tread edges 2t, and the transient characteristic when leaning the machine can be further improved. Further, since the land ratios L1 to L10 of the tread narrow zones T1 to T10 are limited in a range of from 70 to 90%, the grooved area is maintained during straight running as well as during cornering, and a decrease in the drainage can be prevented, and the wet grip performance as well as the dry grip performance can be effectively improved.

If the land ratios L1 to L10 of the tread narrow zones T1 to T10 are less than 70%, then it becomes difficult to fully improve the dry grip performance. If the land ratios L1 to L10 are more than 90%, there is a possibility that the drainage and wet grip performance are deteriorated.

Comparison Tests

Motorcycle tires having the basic internal structure shown in FIG. 2 and the tread pattern shown in FIG. 1 and tread patterns shown in FIG. 5 and FIG. 6 were prepared and tested as follows.

Figure 5:
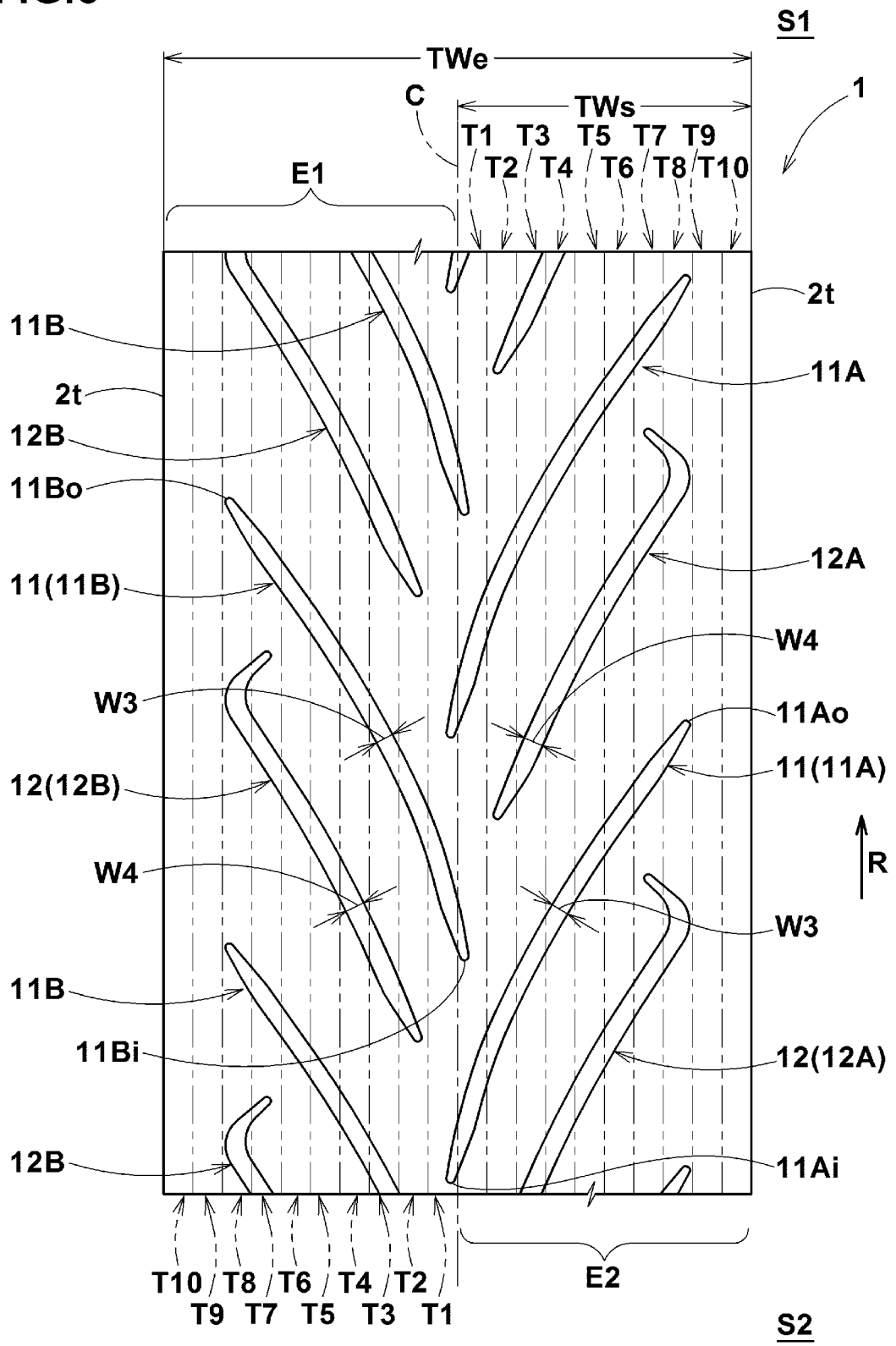
FIG. 5 is a developed partial view showing the tread portion of the undermentioned comparative example tires 1, 2 and 5.

In the tread pattern shown in FIG. 5 (used in Comparative tires Refs. 1, 2 and 5), main oblique grooves and auxiliary oblique grooves were extended to the eighth zone, and no groove was formed in the ninth and tenth zones.

Figure 6:
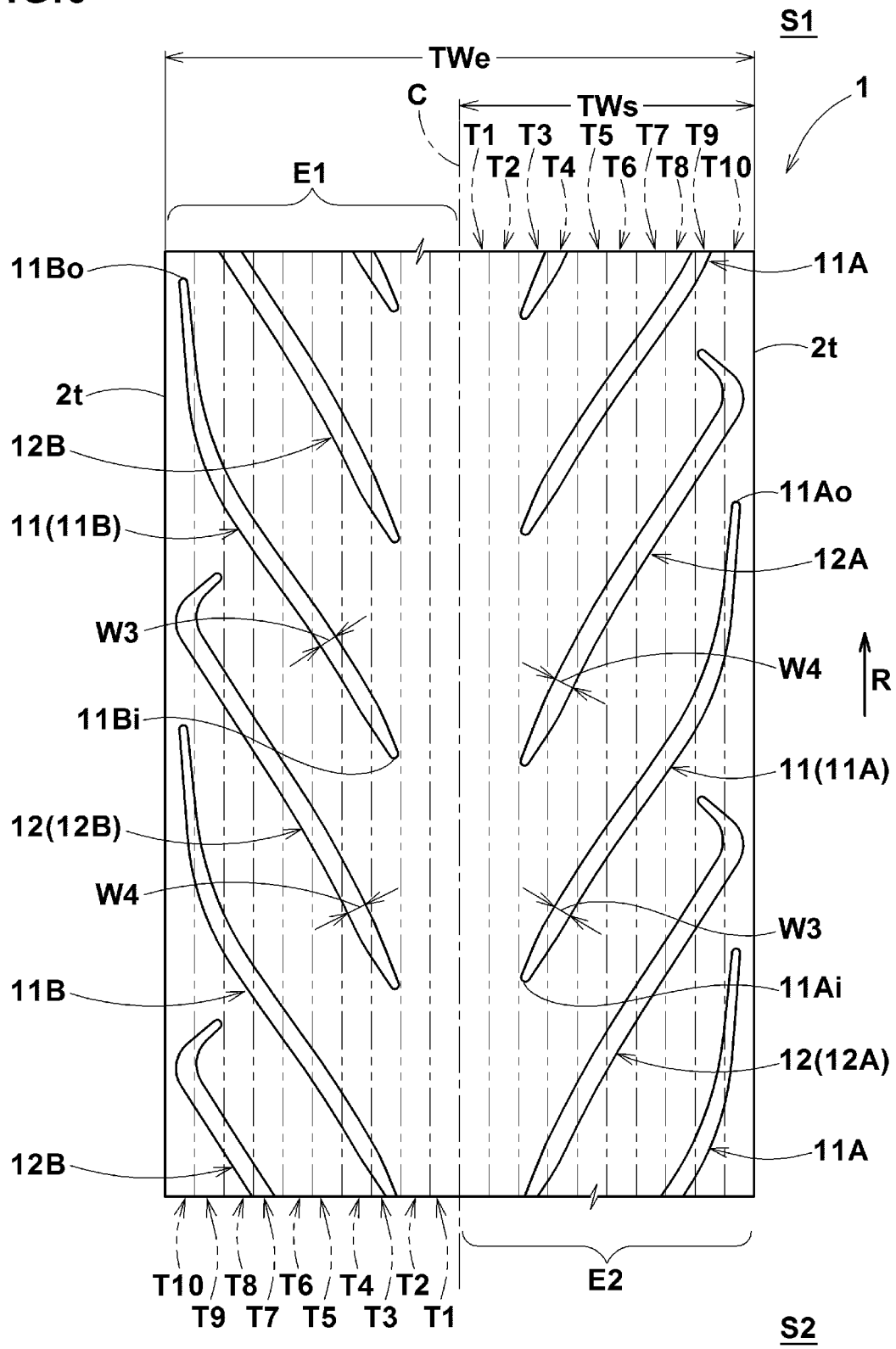
FIG. 6 is a developed partial view showing the tread portion of the undermentioned comparative example tire 6.

In the tread pattern shown in FIG. 6 (used in Comparative tire Ref. 6), main oblique grooves and auxiliary oblique grooves were extended from the third zone, and no groove was formed in the first and second zones.

In the comparative tire Ref. 1, as the belt, two cut plies of rubberized parallel cords were disposed in stead of the jointless belt of a helically wound cord.

Common specifications are as follows. Other specifications are shown in Table 1.

Tire size: 120/70zR17 (Rim size: MT3.50×17)
Maximum tire section width TW: 120 mm (=axial tread width)
Developed tread width TWe: 168 mm
Carcass:
  Cord material: rayon (1840 dtex/2)
Belt:
  developed width W1: 140 mm (W1/TWe=0.83)
  cord material: steel (3×3×0.17 mm)
Main oblique groove:
  maximum depth D3: 4.5 mm
Auxiliary oblique groove:
  maximum depth D4: 4.5 mm <Drainage and Wet Grip Performance Test>

The test tire was attached to 1000 cc motorcycle as the front tire. (tire pressure 250 kPa) For all of the test tires as the front tire, the same tire of size 190/50zR17 (rim size MT6.00×17, tire pressure 290 kPa) was used as the rear tire.

The motorcycle was run on a wet asphalt road surface in a tire test course, and the test rider evaluated the drainage and wet grip performance into five ranks, wherein the higher the rank number, the better the performance. The results are shown in Table 1.

<Stability and High Speed Stability Test>

Running the motorcycle on the dry asphalt road surface, the stability (dry grip, lightness of handling, transient characteristic when leaning, transient handling characteristic) and high speed stability were evaluated by the test rider into five ranks, wherein the higher the rank number, the better the performance. The results are shown in Table 1.

Form the test results, it was confirmed that, according to the present invention, both of the stability and drainage can be achieved at a high level.

TABLE 1

| Tire | Ref. 1 | Ref. 2 | Ex. 1 | Ex. 2 | Ex. 3 | Ref. 3 | Ref. 4 |
|---|---|---|---|---|---|---|---|
| Tread pattern | FIG. 5 | FIG. 5 | FIG. 1 | FIG. 1 | FIG. 1 | FIG. 1 | FIG. 1 |
| Belt structure *1 | Cut | JLB | JLB | JLB | JLB | JLB | JLB |
| Main oblique grooves | | | | | | | |
| groove width W3(mm) | 5.0 | 5.0 | 5.0 | 5.0 | 5.0 | 3.8 | 6.5 |
| inner part angle θ1a, θ2a (deg.) | 15-30 | 30-45 | 15-30 | 15-30 | 15-30 | 15-30 | 15-30 |
| outer part angle θ1b, θ2b (deg.) | 0-10 | 0-10 | 0-10 | 0-10 | 0-10 | 0-10 | 0-10 |
| Auxiliary oblique grooves | | | | | | | |
| groove width W4(mm) | 5.5 | 5.5 | 5.5 | 5.5 | 5.5 | 4.3 | 7.0 |
| main part angle θ3a, θ4a (deg.) | 15-30 | 30-45 | 15-30 | 15-30 | 15-30 | 15-30 | 15-30 |
| secondary part angle θ3b, θ4b (deg.) | 35-55 | 35-55 | 35-55 | 35-55 | 35-55 | 35-55 | 35-55 |
| Land ratio | | | | | | | |
| 1st zone L1 (%) | 83 | 83 | 83 | 83 | 84 | 91 | 77 |
| 2nd zone L2 (%) | 84 | 84 | 84 | 84 | 85 | 92 | 80 |
| 3rd zone L3 (%) | 80 | 80 | 80 | 80 | 81 | 88 | 76 |
| 4th zone L4 (%) | 82 | 82 | 82 | 82 | 82 | 88 | 77 |
| 5th zone L5 (%) | 84 | 84 | 84 | 84 | 84 | 90 | 79 |
| 6th zone L6 (%) | 85 | 85 | 85 | 86 | 85 | 91 | 80 |
| 7th zone L7 (%) | 84 | 84 | 85 | 86 | 85 | 91 | 80 |
| 8th zone L8 (%) | 76 | 76 | 84 | 85 | 84 | 91 | 79 |
| 9th zone L9 (%) | 100 | 100 | 76 | 76 | 76 | 85 | 68 |
| 10th zone L10 (%) | 100 | 100 | 87 | 87 | 87 | 92 | 84 |
| maximum Lm of 1st-8th zones | 85 | 85 | 85 | 86 | 85 | 92 | 80 |
| minimum Ls of 1st-8th zones | 76 | 76 | 80 | 80 | 81 | 88 | 76 |
| Lm − Ls | 9 | 9 | 5 | 6 | 4 | 4 | 4 |
| Test results | | | | | | | |
| drainage | 3.0 | 2.9 | 3.2 | 3.3 | 3.1 | 2.8 | 3.3 |
| wet grip | 3.0 | 3.0 | 3.2 | 3.3 | 3.0 | 2.7 | 3.3 |
| dry grip | 3.0 | 3.0 | 3.0 | 3.0 | 3.2 | 3.3 | 2.7 |
| lightness of handling | 3.0 | 2.8 | 3.2 | 3.2 | 3.3 | 3.1 | 3.1 |
|  | 3.0 | 3.0 | 3.3 | 3.2 | 3.3 | 3.2 | 3.2 |
| transient handling characteristic | 3.0 | 3.0 | 3.3 | 3.2 | 3.2 | 3.2 | 3.2 |
| high speed stability | 2.5 | 3.0 | 3.2 | 3.1 | 3.2 | 3.2 | 2.8 |

| Tire | Ex. 4 | Ex. 5 | Ex. 6 | Ex. 7 | Ref. 5 | Ref. 6 |
|---|---|---|---|---|---|---|
| Tread pattern | FIG. 1 | FIG. 1 | FIG. 1 | FIG. 1 | FIG. 5 | FIG. 6 |
| Belt structure *1 | JLB | JLB | JLB | JLB | JLB | JLB |
| Main oblique grooves | | | | | | |
| groove width W3(mm) | 4.5 | 5.0 | 5.0 | 5.0 | 5.0 | 5.0 |
| inner part angle θ1a, θ2a (deg.) | 15-30 | 30-30 | 30-40 | 0-20 | 15-30 | 15-30 |
| outer part angle θ1b, θ2b (deg.) | 0-10 | 0-10 | 0-10 | 0-10 | 0-10 | 0-10 |
| Auxiliary oblique grooves | | | | | | |
| groove width W4(mm) | 6.5 | 5.5 | 5.5 | 5.5 | 5.5 | 5.5 |
| main part angle θ3a, θ4a (deg.) | 15-30 | 30-30 | 30-40 | 0-20 | 15-30 | 15-30 |
| secondary part angle θ3b, θ4b (deg.) | 35-55 | 35-55 | 35-55 | 35-55 | 35-55 | 35-55 |
| Land ratio | | | | | | |
| 1st zone L1 (%) | 89 | 83 | 83 | 83 | 83 | 100 |
| 2nd zone L2 (%) | 90 | 84 | 84 | 84 | 84 | 100 |
| 3rd zone L3 (%) | 80 | 80 | 80 | 80 | 80 | 80 |
| 4th zone L4 (%) | 82 | 82 | 82 | 82 | 82 | 82 |
| 5th zone L5 (%) | 84 | 84 | 84 | 84 | 84 | 84 |
| 6th zone L6 (%) | 86 | 85 | 85 | 85 | 85 | 85 |
| 7th zone L7 (%) | 85 | 85 | 85 | 85 | 84 | 85 |
| 8th zone L8 (%) | 84 | 84 | 84 | 84 | 76 | 84 |
| 9th zone L9 (%) | 76 | 76 | 76 | 76 | 100 | 76 |
| 10th zone L10 (%) | 87 | 87 | 87 | 87 | 100 | 87 |

TABLE 1-continued

| | | | | | | |
|---|---|---|---|---|---|---|
| maximum Lm of 1st-8th zones | 90 | 85 | 85 | 85 | 85 | 100 |
| minimum Ls of 1st-8th zones | 80 | 80 | 80 | 80 | 76 | 80 |
| Lm − Ls | 10 | 5 | 5 | 5 | 9 | 20 |
| Test results | | | | | | |
| drainage | 3.2 | 3.2 | 3.2 | 3.2 | 3.1 | 2.5 |
| wet grip | 3.2 | 3.2 | 3.2 | 3.2 | 3.1 | 2.5 |
| dry grip | 3.0 | 3.0 | 3.0 | 3.0 | 3.1 | 3.0 |
| lightness of handling | 3.2 | 2.8 | 2.8 | 2.8 | 3.1 | 2.5 |
| transient characteristic when leaning | 2.8 | 3.3 | 2.8 | 2.8 | 2.7 | 2.5 |
| transient handling characteristic | 2.8 | 2.8 | 2.8 | 2.8 | 2.7 | 2.8 |
| high speed stability | 3.2 | 3.2 | 3.2 | 2.9 | 2.7 | 3.0 |

*1 JLB: Jointless structure of a helically wound cord
Cut: Cut ply structure of two cut plies

The invention claimed is:

1. A motorcycle tire comprising a tread portion having a tread face and tread edges, a pair of sidewall portions, a pair of bead portions each with a bead core therein, a carcass extending between the bead portions through the tread portion and the sidewall portions, and a belt made of a helically wound belt cord disposed radially outside the carcass in the tread portion, wherein
the tread portion is provided with oblique grooves so that twenty narrow annular zones of the tread portion each have a land ratio in a range of from 70 to 90%, wherein the twenty narrow annular zones are defined by equally dividing a half developed tread width from the tire equator to each of the tread edges along the tread face by ten, wherein
said oblique grooves are main oblique grooves and auxiliary oblique grooves, and on each side of the tire equator, the main oblique grooves and the auxiliary oblique grooves are arranged alternately in the tire circumferential direction and inclined to one tire circumferential direction,
the angle of each said main oblique groove with respect to the tire circumferential direction is gradually decreased from its middle point toward its axially outer end to extend in a circumferential direction and terminate, and
each auxiliary oblique groove is made up of a main part inclined in the same direction as the main oblique grooves and a secondary part turned at the axially outer end of the main part to extend obliquely toward the tire equator and terminate.

2. The motorcycle tire according to claim 1, wherein
the difference between a maximum value and a minimum value of the land ratios in % of the axially innermost first narrow annular zone to the axially outer eighth narrow annular zone on each side of the tire equator is at most 7.

3. The motorcycle tire according to claim 1, wherein
the main oblique grooves on each side of the tire equator extend beyond the tire equator so as to have axially inner ends located on the other side of the tire equator, and
the auxiliary oblique grooves on each side of the tire equator do not extend beyond the tire equator so as to have axially inner ends located on the same side of the tire equator.

4. The motorcycle tire according to claim 3, wherein
the angle of the main oblique groove with respect to the tire circumferential direction is gradually decreased from said middle point toward its axially inner end.

5. The motorcycle tire according to claim 3, wherein
on each side of the tire equator from the axially innermost first narrow annular zone to the axially outer eighth narrow annular zone,
the main oblique grooves are inclined at an angle of from 10 to 35 degrees with respect to the tire circumferential direction.

6. The motorcycle tire according to claim 3, wherein
on each side of the tire equator, the axially inner ends of the auxiliary oblique grooves are located on the second narrow annular zone next to the axially innermost first narrow annular zone.

7. The motorcycle tire according to claim 6, wherein
said auxiliary oblique grooves have axially outer ends located on the axially outermost tenth narrow annular zone.

8. The motorcycle tire according to claim 7, wherein
on each side of the tire equator from the second narrow annular zone to the eighth narrow annular zone,
the angle of the auxiliary oblique groove with respect to the tire circumferential direction is in a range of from 10 to 35 degrees.

9. The motorcycle tire according to claim 2, wherein
the main oblique grooves on each side of the tire equator extend beyond the tire equator so as to have axially inner ends located on the other side of the tire equator, and
the auxiliary oblique grooves on each side of the tire equator do not extend beyond the tire equator so as to have axially inner ends located on the same side of the tire equator.

* * * * *